United States Patent [19]

Reichardt et al.

[11] Patent Number: 4,752,234
[45] Date of Patent: Jun. 21, 1988

[54] CONTACTING APPARATUS FOR A CHIP-CARD

[75] Inventors: Manfred Reichardt, Weinsberg; Eberhard Raab, Untereisesheim, both of Fed. Rep. of Germany

[73] Assignee: Amphenol Corporation, Wallingford, Conn.

[21] Appl. No.: 900,941

[22] Filed: Aug. 27, 1986

[30] Foreign Application Priority Data

Sep. 2, 1985 [DE] Fed. Rep. of Germany ....... 3531318

[51] Int. Cl.$^4$ ........................................... H01R 13/629
[52] U.S. Cl. ........................................ 439/260; 439/76
[58] Field of Search ....... 339/75 M, 75 MP, 176 MP, 339/113 L; 439/76, 259–265

[56] References Cited

U.S. PATENT DOCUMENTS

| | | | |
|---|---|---|---|
| 3,107,319 | 10/1963 | Vizzier, Sr. | 339/17 LM |
| 3,701,071 | 10/1972 | Landman | 339/176 MP |
| 3,840,840 | 10/1974 | Worth | 339/17 F |
| 3,905,670 | 9/1975 | Anhalt et al. | 339/176 MP |
| 4,397,513 | 8/1983 | Clark et al. | 339/113 L |
| 4,443,049 | 4/1984 | De Pommery et al. | 339/75 MP |
| 4,449,775 | 5/1984 | De Pommery et al. | 339/75 MP |
| 4,468,075 | 8/1984 | Tamura et al. | 339/75 M |

FOREIGN PATENT DOCUMENTS

| | | |
|---|---|---|
| 2933191 | 8/1979 | Fed. Rep. of Germany . |
| 2943864 | 5/1980 | Fed. Rep. of Germany . |
| 2952442 | 7/1980 | Fed. Rep. of Germany . |
| 3145705 | 5/1983 | Fed. Rep. of Germany . |
| 3235654 | 3/1984 | Fed. Rep. of Germany . |
| 3433316 | 4/1985 | Fed. Rep. of Germany . |
| 3412453 | 10/1985 | Fed. Rep. of Germany . |
| 24807 | 7/1914 | Norway .......................... 339/113 L |
| 2021334 | 11/1979 | United Kingdom .......... 339/75 MP |

Primary Examiner—John McQuade
Attorney, Agent, or Firm—Bacon & Thomas

[57] ABSTRACT

A contacting apparatus (1) for a chip-card (2) having card contacts (5) adapted for being brought into contact with the contacting apparatus. A card support (3), which is adapted to receive the chip-card, is movably supported in a housing (4). Card contacts (5) can be brought into contact engagement with contact elements (6) which are stationary with respect to the housing (4).

20 Claims, 6 Drawing Sheets

CONTACTING APPARATUS FOR A CHIP-CARD

BACKGROUND OF THE INVENTION

1. Field of the Invention

The invention is directed to a contacting apparatus for a chip-card.

2. Description of the Prior Art

A chip-card is a generally rectangular card made of plastic material. A microelectronic component, called a chip, is arranged within the card. The chip can be in the form of a storage means for information. Different types of information may be contained in the chip. The information may comprise, for instance, information about the owner of the card or information relating to financial data. In general, the contacting apparatus for a chip-card comprises a number of contact elements which are adapted to engage card contacts, i.e. contacts which are provided on the chip-card. The card contacts are connected with the chip. The contacting apparatus is used together with electronic apparatus for retrieving information from the chip or for storing information in the chip.

In a known contacting apparatus, the contacting elements forming a set of contact elements are adapted to be pivoted towards the card contacts after the card is moved into the contact apparatus. This known design requires a flexible connection between the movable set of contact elements and the contact apparatus per se, i.e. a cable must be provided between the movable set of contact elements and, e.g. the housing of the contacting apparatus so as to allow for the movement of the set of contact elements.

It would be desirable to provide an improved contact apparatus which allows the contacting of the card contacts such that the contact surfaces of the card contacts are not subject to wear due to friction.

It would also be desirable to provide a contacting apparatus which provides for an automatic locking of the card during an operation in which information is read from the card.

Furthermore it would be desirable to provide a contacting apparatus such that the card contacts can be contacted a large number of times without the occurence of faulty contact engagements.

In addition, it would be desirable to provide a contacting apparatus which allows a large number of contact engagements; for instance, up to 500,000 contact engagements with the card contacts should be possible. This would be equivalent to a life expectancy of between 2 to 3 years.

SUMMARY OF THE INVENTION

In accordance with this invention, there is provided a contacting apparatus for a chip-card, the chip card comprising card contacts adapted for being brought into engagement with the contacting apparatus, the contacting apparatus having a housing and card support means adapted to receive the chip-card. The card support means is movably supported in the housing in such a manner that the card contacts can be brought into contact engagement with contact elements which are stationary with respect to the housing.

The present invention thus provides a contacting apparatus for a chip-card comprising card support means, referred to as card guide means, the card support means being arranged such that it can be moved together with the card into a reading position in which the card contacts may be brought into contact engagements with stationary contacts, the stationary contacts being mounted, for example, at the housing of said contact apparatus.

Preferably, the movement of the card guide means from a card insert position to a card reading position is a pivotal movement of the card guide means together with the card which is held in the card guide means. Also, preferably the card which is of substantially rectangular shape is inserted into the card guide means with a narrow side of the card first. The card is either totally inserted or inserted at least for half of its length, whereupon the card guide means is pivoted about a transverse axis which extends transversely with respect to the longitudinal axis of the card.

In addition, this invention provides a contacting apparatus for a chip-card, the chip-card comprising card contacts adapted for being brought into contact with the contacting apparatus, the contacting apparatus having a housing and card support means movably supported in the housing and a adapted to receive the chip-card, contact elements provided in the housing and adapted to engage the card contacts, the contact elements having insulation displacement means, and a flat cable having one end connected to the insulation displacement means and adapted to be connected to an apparatus for retrieving information from the chip or storing information in the chip.

DESCRIPTION OF THE PREFERRED EMBODIMENTS

The invention relates to a contacting apparatus 1 adapted to provide contacting engagement with a chip-card 2. As is well known, a chip-card is generally a card made of plastic material including a microelectronic chip, for instance, an information storage means.

Initially, a first embodiment of a contacting apparatus 1 will be described while referring to the extremely schematic representations of FIGS. 1 to 3. Within the contacting apparatus 1, card support means 3 is provided. Card support means 3 will be referred to below as card guide means. Card guide means 3 is movably mounted within contacting apparatus 1 in such a manner that a chip-card 2 being placed on card guide means 3 and having card contacts 5 can be brought into engagement with stationary contact elements 6. Generally, contact elements 6 are mounted on contacting apparatus 1. Preferably, contact elements 6 are mounted on a housing 4 and form altogether a set 7 of contact elements. Mounting means 20 is used for mounting contact elements 6 on housing 4. Set 7 of contact elements will be discussed in detail below. As is quite evident, an exchange of information between the chip of the chip-card and an apparatus connected to contact elements 6 can occur in a situation where contact elements 6 are in engagement with card contacts 5.

Housing 4 comprises a front wall (apparatus panel) 11, a right side wall 12 and a left side wall 13 as well as a back wall 14, an upper wall 15 and a bottom wall 16. Housing 4 of contacting apparatus 1 of the invention is relatively small. For instance, the height H is 14 mm, the length L is 91 mm and the width W is 66 mm.

In the embodiment shown, front wall 11 comprises an insert slot 36 through which card 2 may be moved into the interior of contacting apparatus 1. When card 2 is inserted into contacting apparatus 1, the card will be received by card guide means 3 which is aligned with insert slot 36. In accordance with a preferred embodiment of the invention, card guide means 3 is pivotably mounted preferably about a pivot axis 8 which extend transversely with respect to the direction in which the card is inserted (insert direction). Pivot axis 8 is located in a position approximately in the middle of an inserted card 2. Preferably, the card is inserted into the insert slot 36 starting with the narrow guide or edge of the card. The pivotable support of the card guide means 3 will be described in detail below.

Figure 1:
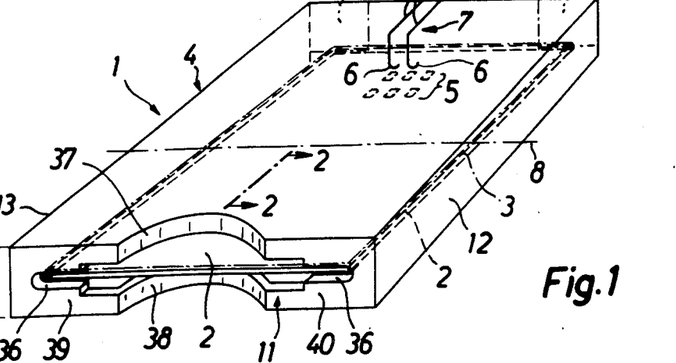
FIG. 1 is a schematic isometric view of a contacting apparatus of the invention.
Figure 2:
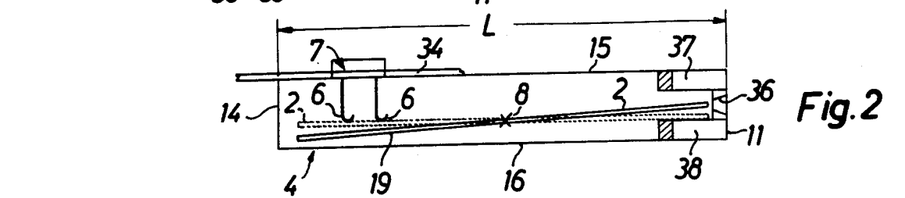
FIG. 2 is a schematic longitudinal cross-sectional view along line 2—2 in FIG. 1, showing a slightly modified embodiment.

For the embodiment of FIGS. 1 and 2, the insert operation of card 2 occurs in a direction which is slightly inclined in the downward direction, as can be recognized by the position of card 2 shown in Figure 2. For reasons of clarity, FIG. 2 does not show the card guide means. However, card guide means 3 is located below card 2. In FIG. 1, the shape of card 2 is only shown by a dotted line, while card guide means 3 is represented by two lines, each of which is dashed. On the other hand, FIG. 2 shows card 2 with solid lines in the insert position, and the dashed representation of card 2 shows the card in the reading position. In FIG. 1, card guide means 3 as well as card 2 are still in the insert position, i.e. card 2 was inserted but is not yet in the reading position still to be described.

In order to simplify the insertion of card 2 into card guide means 3, front wall 11 is provided with an upper finger recess 37 and preferably also with a lower finger recess 38, so that substantially only a left front wall 39 and a right front wall 40 extend forwardly and are arranged in a common plane.

Due to the rotary or pivotal mounting of card guide means 3, the possibility exists that contact elements 6 of set 7 of contact elements can be arranged in a stationary manner adjacent to card guide means 3 and chip-card 2 supported by card guide means 3, respectively, such that only after card 2 is moved with respect to contact elements 6, the connection (engagement) between contact elements 6 and card contacts 5 is provided.

In accordance with the present invention, detent or locking means are provided for locking card guide means 3 in an insert position and/or a reading position. This will be explained in detail below by referring to FIGS. 4 and 5.

Figure 3:
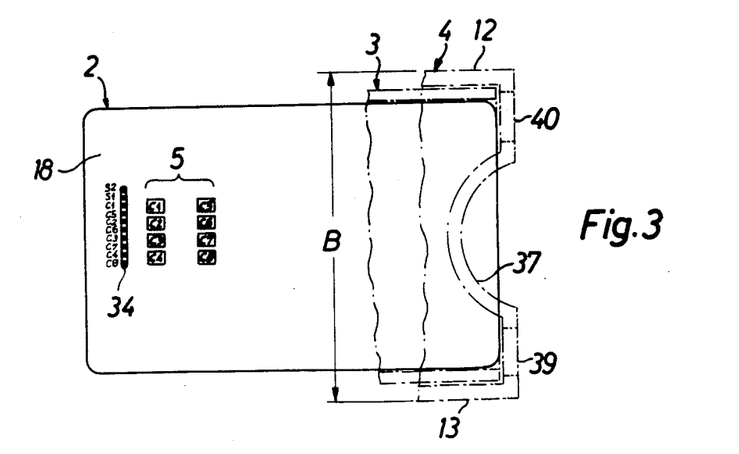
FIG. 3 is a schematic plan view of the chip-card.

Reference will now be made to FIG. 3 which discloses a schematic representation of a part of housing 4 with a chip-card 2 being inserted. Chip-card 2 is provided at its upper surface 18 with card contacts 5 which are individually referred to by reference numerals C1 to C8. Adjacent to contacts 5, a flat cable 34 (see FIG. 3) is shown in a cross-sectional representation. The individual wires of flat cable 34 are referred to by reference numerals S2, S1 and C1 to C8. The allocation of the wires of flat cable 34 with respect to card contacts 5 will be discussed below in connection with FIGS. 12 to 15.

Summarizing the embodiments of FIGS. 1 to 3, it may be said that the rotary mounting of the card guide means within housing 4 together with a fixedly mounted set 7 of contact elements makes it unnecessary to provide for a flexible termination (connected) of set 7 contact elements.

Figure 4:
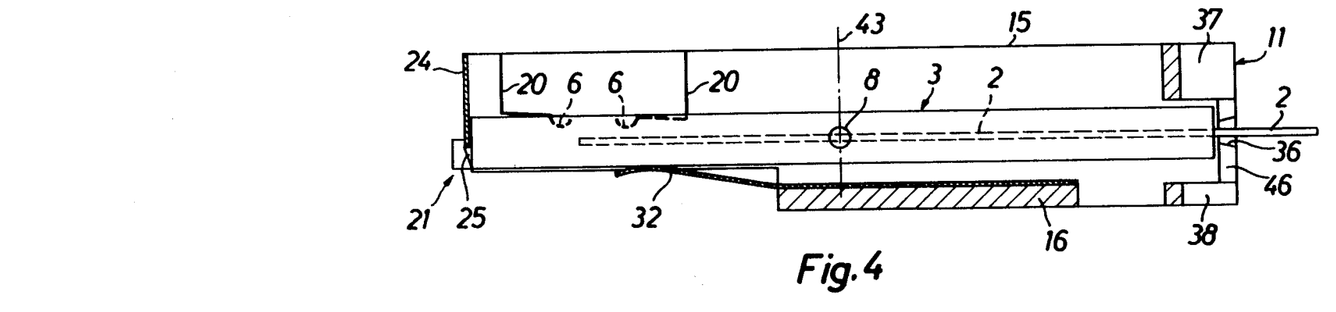
FIG. 4 is a schematic longitudinal cross-section substantially along line 2—2 in FIG. 1 showing the card guide means in the card insert position.
Figure 5:
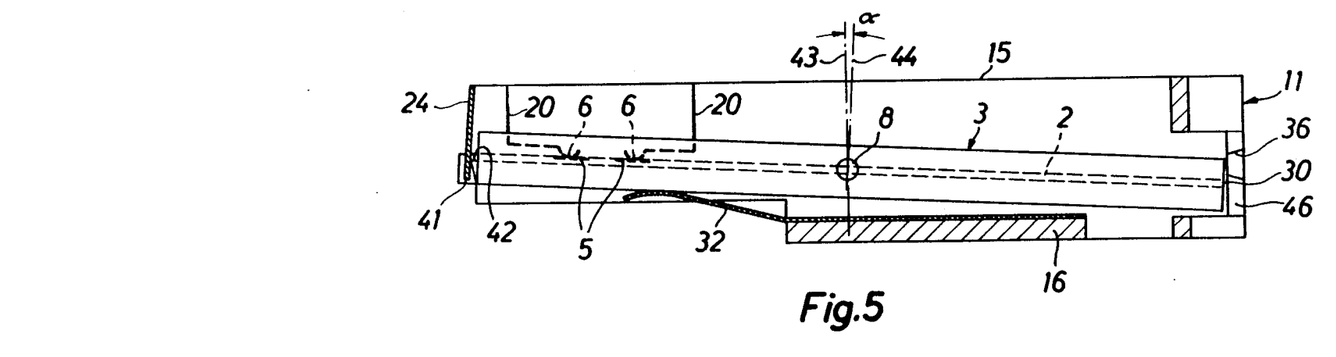
FIG. 5 is a sectional view similar to the sectional view of FIG. 4 with the card guide means being shown in its reading position.

Another embodiment will be described in connection with FIGS. 4 and 5. In substance, this embodiment is a further development of the embodiment of FIGS. 1 to 3. Therefore, reference numerals similar to the reference numerals of the embodiment of FIGS. 1 to 3 are used in FIGS. 4 and 5. The main distinction between the embodiment of FIGS. 4 and 5 and the embodiment of FIGS. 1 to 3 resides in the fact that card guide means 3 of FIGS. 4 and 5 extends in its insert position, shown in FIG. 4, substantially horizontally, while the card guide means of FIG. 5 extends in its reading position in a slightly inclined manner, with the inclination going upwardly towards the left. FIGS. 4 and 5 show detent or locking means at 21 and further spring means in the form of a leaf spring 32 is provided so as to bias the card guide means into a direction towards stationary contact elements 6.

The detent or locking means 21 comprises a first detent element in the form of a detent spring 24 and a second detent element in the form of a detent edge 25. Detent spring 24 is a leaf spring. In practice, as is shown in FIG. 1, two leaf springs 23 and 24 may be used and are mounted the housing (or the frame) 4 of contacting apparatus 1. Detent edge 25 is provided at card guide means 3 and forms an abutment surface 42 on which the bottom edge 41 of detent spring 24 may abut. Similar explanations hold true when two detent springs 23, 24 are used as is shown in FIG. 1.

Figure 8:
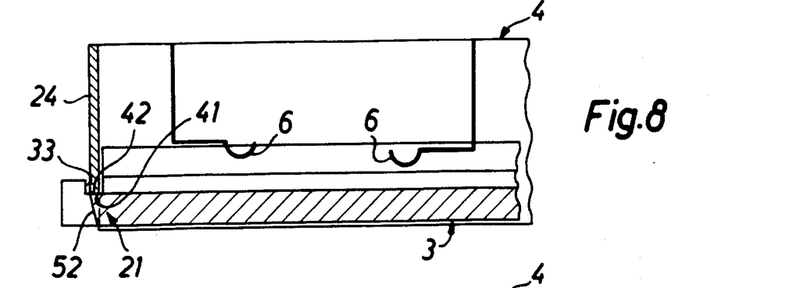
FIGS. 8–11 are schematic partial cross-sectional views of the different positions of the card guide means, positions which will be assumed by the embodiments of FIGS. 4–7.

FIG. 4 illustrates card guide means 3 in the insert position, i.e. extending perpendicularly with respect to the vertical line 43. In the insert position, the insert opening (referred to by reference numeral 30 in FIG. 5) of card guide means 3 is aligned with insert slot 36 of front wall 11. In the representation of FIG. 4, card 2 is not yet completely inserted into card guide means 3. In FIG. 5, however, card 2 has pushed detent spring 24 off abutment surface 42 during the movement of card 2 towards an end abutment 33 which is shown in FIG. 8 and will be described in detail below. Since detent spring 24 was pushed off abutment surface 42, a pivotal movement of card guide means 3. into the position shown in FIG. 5 was possible. During said pivotal movement about an angle α between the vertical 43 and a line 44 in FIG. 5, insert opening 30 is made inaccessible. This is done by having insert opening 30 disappear behind cover means 46 provided by the front wall 11 (see FIG. 5).

Spring means in the form of a leaf spring 32 maintains card guide means 3 in the reading position of FIG. 5. The spring means is provided at the housing or preferably at bottom wall 16. In the reading position stationary contact elements 6 are in engagement with card contacts 5.

The force required to pivot card guide means 3 from the position of FIG. 4 to the position of FIG. 5 is primarily provided by the user. After the user has inserted the card, he will hold the card between his thumb and index finger and move the card together with card guide means 3 downwardly. Leaf spring 32 may assist in this movement.

Figure 6:
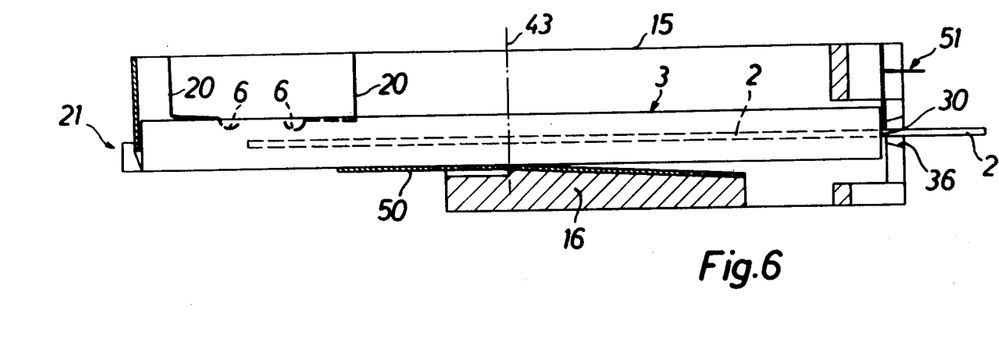
FIG. 6 is a longitudinal cross-sectional view substantially along line 2—2 FIG. 1 of another embodiment, with the card guide means being in the card insert position.
Figure 7:
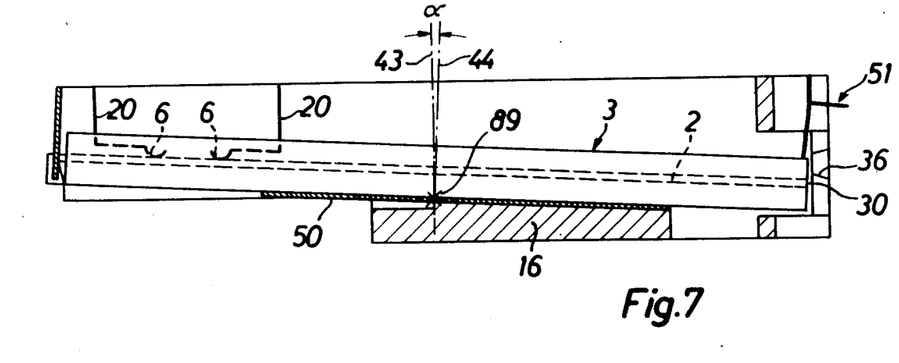
FIG. 7 is a sectional view of similar to FIG. 6 with the card guide means of FIG. 3 being in the card reading position.

The cross-sectional views of FIGS. 6 and 7, disclose the insert position and reading position, respectively, of another embodiment of the invention. The embodiment of FIGS. 6 and 7 differs from the embodiment of FIGS. 4 and 5 only in so far as the embodiment of FIGS. 4 and 5 does not require a physical transverse rotary axis or shaft. In FIGS. 6 and 7 the transverse rotary axis is provided for by a tensioning web 50. Tensioning web 50 is mounted on the one hand at bottom wall 16 and on the other hand at the lower surface of card guide means 3. Moreover, locking means in the form of a lever 51 is mounted in housing 4 in such a manner that the locking means can cooperate with the forward edge of card guide means 3 which is located adjacent to insert slot 36.

Primarily, tensioning web 50 provides for the rotary or pivotal mounting of card guide means 3 as was true for the embodiment of FIGS. 4 and 5. The transverse rotary axis 89 corresponds in this respect to the transverse rotary axis 8. This mounting allows for a pivotal movement about the angle α between the vertical 43 and line 44 in FIG. 7, i.e. between an insert position and a reading position. Again, as in the reading position of FIG. 7, the access to insert opening 30 of card guide means 3 is blocked as was true for the embodiment of FIG. 5.

In FIG. 6 tensioning web 50 is shown as being bent in its left hand part. In this position, tensioning web 50 biases card guide means 3 towards the insert position of FIG. 6, so opening 30 and insert slot 36 are aligned. When card 2 is completely inserted into card guide means 3 then for a completely inserted card 2 the detent or locking means 21 are released with the consequence that the user may pivot card guide means 3 together with card 2 into the reading position shown in FIG. 7. Consequently, locking means 51, which is not in engagement with card guide means 3 in the position shown in FIG. 6, will pivot and come into engagement with card guide means 3 so as to hold card guide means 3 in the reading position of Figure 7. If it is desired to move card guide means 3 from the reading position of FIG. 7 again into the insert position of FIG. 6, then the user manually rotates locking lever 51 counterclockwise (see FIG. 7) so far that card guide means 3 is released by the locking means 51. The tensioning web 50 will then return card guide means 3 into the insert position of FIG. 6 with the detent or locking means 21 being reengaged.

Referring to FIGS. 8 to 11, the detent or locking means 21 and its function will be described in detail for a contacting apparatus shown in FIGS. 4 and 5, and FIGS. 6 and 7, respectively.

In FIG. 8 card guide means 3 is shown in its horizontal insert position. It should be noted that in FIG. 8 only one of the two locking means disclosed in FIG. 1 is shown. The locking or detent means is provided in the form of a detent spring 24. Detent spring 24 engages by means of its bottom edge 41 the upper surface of card guide means 3. In the area of detent spring 24 (and also 23) card guide means 3 is designed in such a manner that an abutment means surface 52 is formed which extends abruptly in a downward direction. As is shown in FIG. 8, an abutment surface 33 is formed by card guide means 3 for card 2, abutment surface 33 being located a small distance from detent spring 24 in its detent position.

Figure 9:
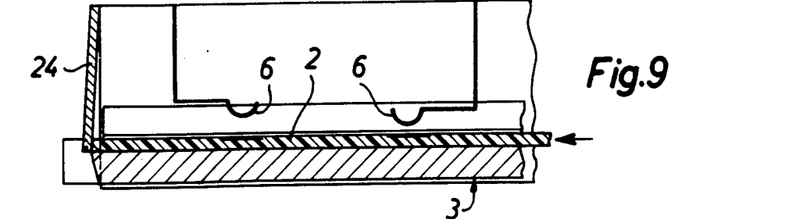
Figure 10:
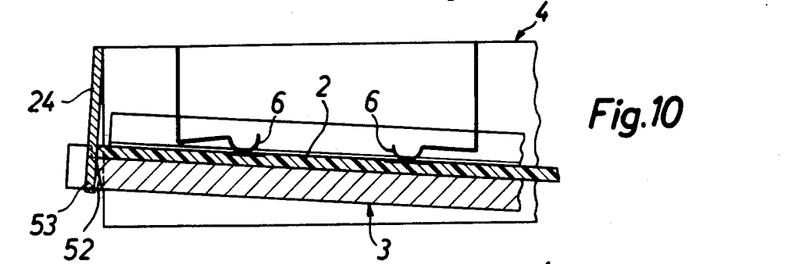

Therefore, if the card, as is shown in FIG. 9, is moved into the card guide means, the card will firstly encounter the lower ends of detent spring 24 (and 23) and push said ends off abutment surface 42 of the detent means 25 so that the disengaged position of the detent means shown in FIG. 9 is reached. When the movement of card 2 in the insert direction continues, the card will eventually abut at end abutment 33. Inasmuch as detent spring 24 (the same is true for detent spring 23) is no longer in an abutting relationship with abutment surace 42, card guide means 3 can be pivoted into the reading position of FIG. 10. During this pivotal movement, the abutment surface 53 of detent spring 24 will come into engagement with the abutment means surface 52 (for the embodiment of FIGS. 4 and 5, this pivotal movement is carried out with the assistance of pressure spring 32). In the reading position, card contacts 5 are held in contact engagement with stationary contact elements 6.

Figure 11:
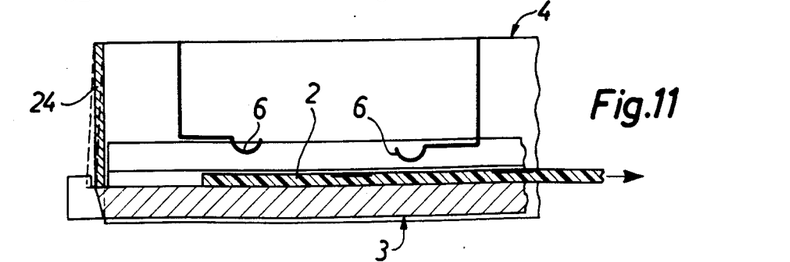

In FIG. 11 the card removal position is shown. To bring card guide means 3 into the card removal position, the user grips and pivots the card guide means and the card. During this pivotal movement, detent spring 24 will return to its position shown in Figure 8. Due to the movement of detent spring 24 (and 23) chip-card 2 will be automatically pushed out of the insert slot by a corresponding distance.

Referring to FIGS. 12 to 17, set 7 of contact elements as provided by the invention will be discussed together with the possibilities of connecting set 7 with a flat cable 34.

Figure 12:
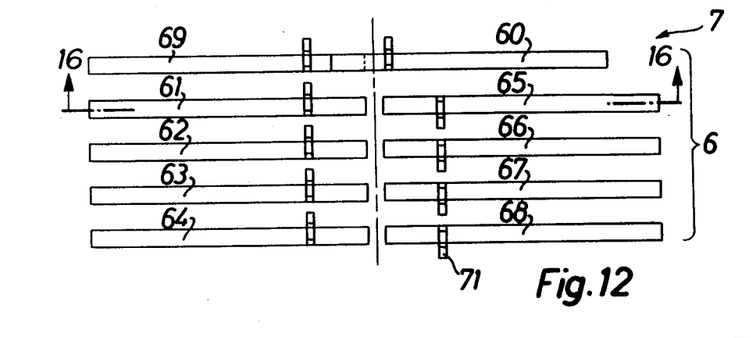
FIG. 12 is a schematic representation of the contacts located at the housing of the contacting apparatus.
Figure 14:
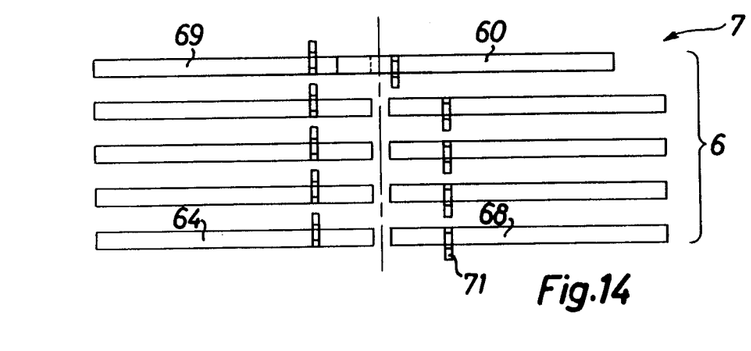
FIG. 14 is a schematic representation of another arrangements of the stationary contacts.

FIGS. 12 and 14 are schematic representations of the arrangement of stationary contact elements 6 (fixedly mounted to the housing) which form a set 7 of contact elements. Inasmuch as card 2 comprises altogether eight card contacts C1 to C8, a corresponding number of contact elements 6 is provided and reference numerals 61 to 68 refer to said contacts. Contact element 61 is adapted for providing a connection to card contact C1. Contact element 65 is adapted to provide a connection to card contact C5, etc. For termination of flat cable 34 as shown in FIG. 2, contacts 61 to 68 are provided at their ends with insulation displacement means 71.

In accordance with the invention, the set of contact elements further comprises two additional contact elements 60 and 69, each of which is provided with insulation displacement means. Contacts 60 and 69 may be used to realize the circuits shown in FIGS. 13 and 15.

Figure 13:
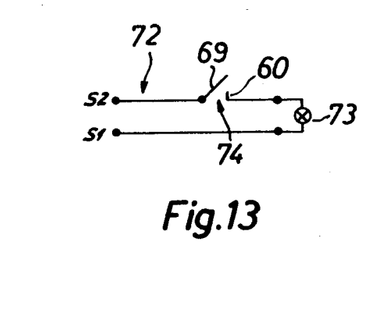
FIG. 13 is a circuit which can be realized with the contact arrangement shown in FIG. 12.

The circuit of FIG. 13 is realized with the two contact elements 60 and 69. The contact elements 60 and 69 of FIG. 14 are used to realize the circuit of FIG. 15.

Figure 15:
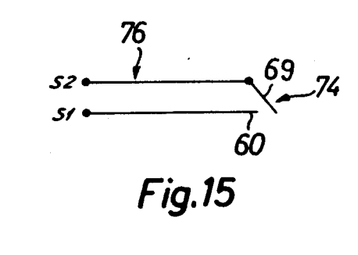
FIG. 15 is a circuit which can be realized with the contact arrangement of FIG. 14.
Figure 16:
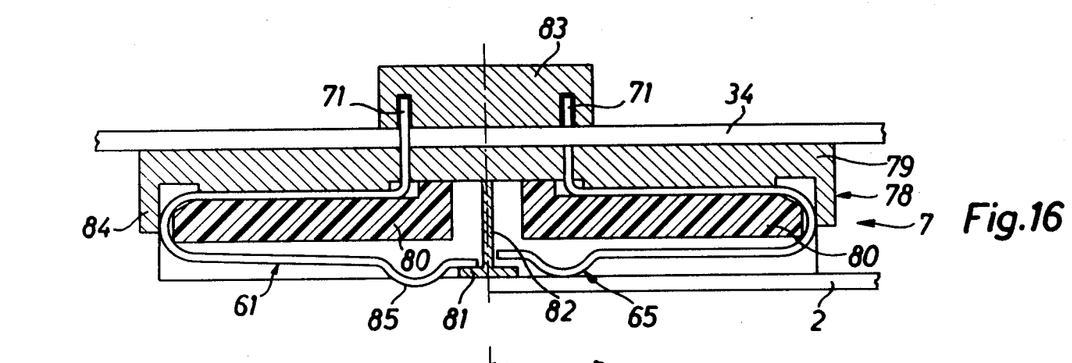
FIG. 16 is a cross-sectional view of the stationary contacts and components thereof.
Figure 17:
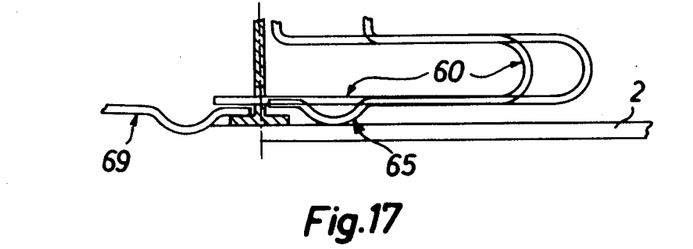
FIG. 17 is a partial cross-sectional view of FIG. 16 showing a different contact shape which is useful for realizing the circuits of FIGS. 13 and 15.

Before describing the circuits of FIG. 14 and 15 in detail, the design of the contact elements as shown in FIG. 16 and 17 will be explained.

FIG. 16 is a schematic longitudinal sectional view along lines 12—12 in FIG. 12.

FIG. 16 discloses an insulation body 78 adapted to receive individual contact elements 61 and 65. Insulating body 78 comprises an insulating plate 79 which is mounted by means (not shown) on the housing of card guide means 3. Flat cable 34 is arranged on the upper surface of insulating plate 79. In its position shown in FIG. 16, flat cable 34 is already pressed into insulation displacement means 71 by means of clamping means 83. The other end of flat cable 34 is connected to an electronic apparatus for retrieving and/or storing information.

Abutment walls 84 project away from the lower edge of insulating plate 79. Centrally located on insulating plate 79 is a wall 82 which separates the two rows 61–64 and 65–68, respectively, of the contact elements. At the lower end of wall 82, abutment means 81 extends transversely. Abutment means 81 is adapted for cooperation with contact elements yet to be described, for instance, with contact elements 61 and 65 of the two groups of contact elements. Supporting members 80 maintain contact elements 61–65 in their position and are fixedly mounted to insulating plate 79 by means not shown.

Contact elements 61 and 65 are representative for the remaining contact elements and they are of a generally U-shaped design. The bight portion of the "U" extends around the supporting means 80. Both groups of contact elements separated by wall 82 are of symmetric design. Contact elements 61–65 rest with their free ends with a springy characteristic on abutment 82. Adjacent to the free ends, contact elements 61–65 are provided with contact projections 85 which serve for contacting and-/or engagement with the upper surface of card contacts 5 and the card itself. In the right hand part of FIG. 16, there is shown how card 2 is in contact with contact element 65. Contact element 65 will be lifted from the abutment 81 and will, due to its inherent spring force, press against the card contact which is located there. In the left hand side of FIG. 16, the rest position is shown for contact element 61.

In accordance with the invention, the design of the contact elements 60 and 69 is as follows. As is shown in FIG. 17, contact element 69 corresponds in its design to contact element 61. However, contact element 60 is of a design different from the design of contact element 65 which is also shown in FIG. 17 for comparison purposes. Contact element 60 does not have a contact projection 85 as is shown in FIG. 16, but contact element 60 is prolonged and extends through an opening in wall 82 so as to end adjacent to the upper surface of contact element 69. The opening in wall 82 is large enough so as to provide for a sufficient space allowing the movement of contact element 60. Keeping this description in mind, one recognizes that for a completely inserted card 2, contact element 69 provides for a connection to contact element 60. The inserted card 2 therefore causes the closing of the two contact elements 69 and 60 and it can be said that the two contact elements 69 and 60 form a switch 74. It should be noted that the differently shaped contact element 60 may be manufactured from the same sheet material from which the other contact elements are manufactured. The differently shaped contact element 60 is simply bent in a differently manner as was pointed out above.

As mentioned, contact elements 60 and 69 form, for all practical purposes, a switch which is open when no card 2 is inserted and which is closed when the card is inserted. Switch 74 is used in the two circuits shown in FIG. 13 and 14, respectively.

The circuit 72 as shown in FIG. 13 may be used to provide an indication of the condition of operation. For example, a light emitting diode 73 may be used to indicate to the user the condition of complete insertion of card 2. For this purpose, the two wires S1 and S2 of the flat cable are connected to a voltage source (not shown). As soon as card 2 is completely inserted, switch 74 closes in a manner described in connection with FIG. 17, and the light emitting diode 73 of circuit 72 starts to emit light. For a realization of this circuit, one wire S1 is directly connected with light emitting diode 73, while the other wire S2 is connected to switch 74 formed by contact elements 69 and 60. As is shown in FIG. 12, this can be done by introducing the wire S2 into the insulation displacement means which is located on the same level, with the wire being interrupted in between.

For the circuit 76 of FIG. 15, the two wires S1 and S2 are guided to the two appropriate insulation displacement means 71 which are offset with respect to each other. The closing condition and the opening condition, respectively may be sensed by switch 74 via said wires S1 and S2.

The above description of the embodiments explains the movement of the card guide means from an insert position into a reading position by a manual operation of the user. Similarly, the return of the card guide means from the reading position to the insert position is manually carried out by the user. However, it is also possible to use a solenoid activated return movement into the insert position instead of the manual return of card guide means 3. It would be similarly possible to use a solenoid activated pivotal movement of the card guide means from the insert position to the reading position.

For the so-called manual contact element engagement technique, the rotary movement of the card guide means initiated by hand occurs against the force of the tensioning or bearing band (tensioning web) 50 which acts as a reset spring and also against the force of contact elements 6 as is shown in FIGS. 6 and 7. For the embodiment of FIGS. 4 and 5, the rotary movement of card guide means 3 initiated by hand occurs for all practical purposes only against the force of contact elements 6 with spring 32 assisting in said rotary movement.

In the reading position of the embodiment of FIGS. 4 and 5, card guide means 3 will be held in its contact position due to the force of spring 32. For the embodiment of FIGS. 6 and 7, the locking of the card guide means in the reading position is effected by lever 51.

In order to return the card guide means from the reading position into the insert position, a release operation must be carried out. For the embodiment of FIGS. 4 and 5, the user effects the movement back into the insert position while, for the embodiment of FIGS. 6 and 7, web 50, which acts as a reset spring, will effect the return movement into the insert position.

According to embodiments not shown, it is also possible to initiate the rotary movement of the card guide means from the insert position to the reading position by means of an actuating lever which will be locked in the reading position. For the return movement, the locking means will be released and a reset spring returns the card guide means into the insert position. According to another possibility, a card guide means could be provided having the rotary axis located at the edge of the card, and the actuating lever makes it impossible to remove the card in the reading position by carrying a plate which will close the insert opening in the reading position.

We claim:

1. A contacting apparatus for a chip card having card contacts, said apparatus comprising:
a housing,
contact elements adapted to contact said card contacts and located stationary within said housing,
card support means movably mounted in said housing and adapted to receive a chip card, wherein said card support means is movable between a card insert/output position and a card reading position such that in the card reading position the card contacts are in contact engagement with the stationary contact elements, and
detent means provided for said card support means, said detent means being adapted to locate said card support means in said card insert/output position, and wherein said detent means are adapted to be released by said card itself when said card reaches the end position of its insert movement into said card support means, whereupon said detent means releases said card support means for movement into the reading position.

2. The contacting apparatus of claim 1, characterized in that said card support means is formed by card guide means, said card guide means being pivotally mounted within said contacting apparatus about a transverse rotary axis.

3. A contacting apparatus as set forth in claim 2, characterized in that said card guide means is pivotally mounted between an insert position and a reading position.

4. The contacting apparatus of claim 3, characterized in that after carrying out the pivotal movement of the card guide means from the insert position into the reading position, a card removal blocking means becomes effective which will block the removal of said card from said contacting apparatus.

5. The contacting apparatus of claim 3, characterized in that fixed abutment means is provided at said card guide means for defining the end position of said card in said card guide means and that during the insert operation of the said card into said card guide means, said detent means will be released prior to said card reaching said abutment, so as to allow a pivotal movement of said card guide means together with said card.

6. The contacting apparatus of claim 3, characterized in that an insert opening for the card guide means is blocked by cover means when said card guide means is in the reading position.

7. The contacting apparatus of claim 3, characterized in that the return movement of said card guide means from the reading position into the insert position for the purpose of removing the card is carried out by an opposite pivotal movement, with said card being moved towards the insert opening by means of said detent means as soon as said card has reached the insert position.

8. The contacting apparatus of claim 1, characterized in that said contact elements forming a set of contact elements are fixedly mounted to said housing.

9. The contacting apparatus of claim 3, characterized in that the card guide means is in its insert position in a horizontal position substantially parallel to an upper wall of the housing of said contacting apparatus, while said card guide means in the reading position takes a position in which the end of the card, inserted into said contact apparatus, is pivoted towards said upper wall.

10. The contacting apparatus of claim 3, characterized in that said card guide means is inclined in a downward direction in the insert position of said card guide means.

11. The contacting apparatus of claim 3, characterized in that said detent means comprises a first detent element in the form of a detent spring designed as a leaf spring, said detent means further comprising a second detent element in the form of a detent edge, said detent edge being provided at said card guide means forming an abutment surface for said first detent element.

12. The contacting apparatus of claim 3, further comprising a tensioning web, said tensioning web being mounted at a bottom wall of said apparatus and at the bottom side of said card guide means.

13. The contacting apparatus of claim 1, characterized in that said contact elements are fixedly mounted at said housing by means of an insulating body.

14. The contacting apparatus of claim 13, characterized in that said insulating body forms a wall, said wall separating two rows of contact elements, and wherein an abutment is provided at said wall and extends in a transverse direction, said abutment being used as an abutment for said contact elements.

15. The contacting apparatus of claim 13, characterized in that said contact elements are generally U-shaped.

16. The contacting apparatus of claim 14, characterized in that said contact elements are in biased engagement with said abutment.

17. The contacting apparatus of claim 14, characterized in that at least one of said contact elements is extended and projects through an opening in said wall so as to end adjacent to the upper side of another contact element.

18. A contacting apparatus of claim 1, characterized in that two contact elements form a switch, said switch being open when no card is inserted and being closed when a card is inserted.

19. The contacting apparatus of claim 13, characterized in that said contact elements which are fixably mounted at said housing are in the form of a set of contacts, each of which is provided with insulation displacement means, said contact elements being connected to a flat cable via said insulation displacement means.

20. The contacting apparatus of claim 3, characterized in that the card guide means is in its insert position in a horizontal position substantially parallel to a bottom wall of the housing of said contact apparatus, while said card guide means in the reading position takes a position in which the end of the card, further inserted into said contact apparatus, is pivoted towards an upper wall.

* * * * *